No. 801,580. PATENTED OCT. 10, 1905.
J. C. N. FOUILLOY.
ATTACHING COLLAR FOR PNEUMATIC TIRES.
APPLICATION FILED FEB. 20, 1905.

Witnesses
Inventor
Jules César Napoléon Fouilloy
By
Attorneys

UNITED STATES PATENT OFFICE.

JULES CÉSAR NAPOLÉON FOUILLOY, OF PARIS, FRANCE.

ATTACHING-COLLAR FOR PNEUMATIC TIRES.

No. 801,530. Specification of Letters Patent. Patented Oct. 10, 1905.

Application filed February 20, 1905. Serial No. 246,588.

*To all whom it may concern:*

Be it known that I, JULES CÉSAR NAPOLÉON FOUILLOY, a citizen of the French Republic, and a resident of Paris, in the Department of Seine, France, have invented some new and useful Improvements in Attaching-Collars for Non-Slipping Protecting Devices for Pneumatic Tires, of which the following is a specification.

My invention has for its object an attaching-collar for fixing around the pneumatic tires of automobiles the leather bands, so called "non-slipping protecting devices," of any system not cemented on the pneumatic tires.

Figure 1:
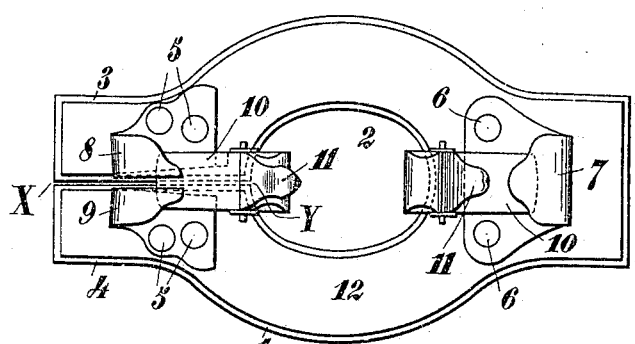
Figure 2:
Figure 3:
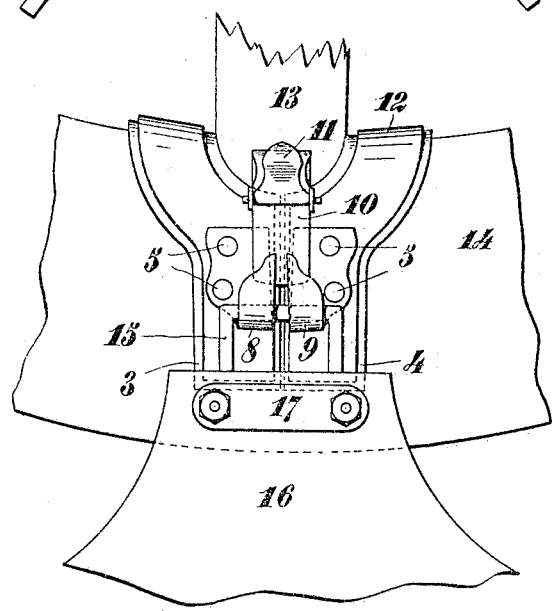

Figure 1 of the annexed drawings is a plan view of the attaching-collar. Fig. 2 is a longitudinal elevation, and Fig. 3 is a side elevation. In this latter figure the collar is assumed to be mounted on the wheel of the automobile car.

The collar is composed of a thick leather piece 1, one of the ends of which is slotted, as shown at X Y, having in its center an opening 2, corresponding to the shape of the spoke 13 of the wheel on which it is to be mounted. In order to give more strength to the collar, the leather piece is covered with one or more sheets of copper 12 or any suitable metal or even with one or more coats of an inextensible or metallic fabric. This metallic part 12 bends at the same time as the leather piece 1, when the latter fits around the rim 14 of the wheel. At both ends of the collar hooks are fixed, which are intended for receiving the ring 15, which holds the edge of the leather piece 16, called "non-slipping protecting device." On the not-slotted side is a single hook 7, held by two rivets 6 6. On the other side are twin hooks 8 and 9, fixed on each one of the tongues 3 and 4 by means of two rivets 5 5 for each hook. These twin hooks have each of them half of the width of the hook 7.

In order to prevent when the pneumatic tire collapses that the attaching-collar 15 of the protecting device may come out of engagement from the hooks of the collar, I have provided said hooks with two spring-fastenings. Each fastening is composed of a spring-clamp 10, on which a tongue or lever 11 is adapted to act. If the ring 15 of the protecting device needs to be hung, the tongue 11 must be turned upward, as seen on the left side of Fig. 2, the spring 10 is brought down, and the ring is permitted to come down into the twin hooks 8 and 9. On the right side of Fig. 2 it is to be seen how the ring 15, placed on the other side of the wheel-rim, is held in the hook. The tongue 11 has been rocked downward and said tongue has ceased to lean upon the spring 10, which has raised itself and lies now against the inside of the hook 7. The locking of the parts is thus secured, and the ring when the pneumatic tire collapses cannot escape from the hook. On the slotted side of the hook the clamp is held by the two rivets 5 5, which are situated on the same side of each tongue.

Fig. 3 is a side elevation of the attaching-collar on the slotted side. The ring 15 of the protecting device 16 is maintained firmly upon the edge of that protecting device by means of a bolted plate 17 or by any other convenient means.

What I claim, and desire to secure by Letters Patent of the United States, is—

1. The attaching-collar for non-slipping protecting devices of pneumatic tires of any not-cemented systems, comprising a leather piece having in its center an opening corresponding to the spoke of the wheel, such leather piece being strengthened by a metallic part, and carrying hooks with spring-fastenings, intended for holding the attaching-rings of the non-slipping protecting device, substantially as above described.

2. An attaching-collar for non-slipping protecting devices for pneumatic tires comprising a strip of flexible material provided with a central opening, a reinforcing-plate secured to the strip and provided with a central opening, hooks on the ends of the plate, for engaging the attaching-ring of the non-slipping protecting device, and means on the hook to prevent disengagement of the ring.

3. An attaching-collar for non-slipping protecting devices for pneumatic tires, comprising a plate having a central opening and a slot in the end of the plate communicating with the opening, hooks on the ends of the plate for engaging the rings on the non-slipping device, and means for preventing disengagement of the rings from the hooks.

4. An attaching-collar for non-slipping protecting devices comprising a plate provided with a central opening, and a slot on the end of the plate communicating with the opening, a facing of flexible material on the inner face of the plate, and hooks on the opposite ends of the plate.

5. In an attaching-collar for non-slipping protecting devices the combination of a plate provided with a facing of flexible material, hooks on the ends of the plate for engaging the rings of the protecting device, and means on the plate for preventing disengagement of the rings from the hooks.

In testimony that I claim the foregoing as my invention I have signed my name, in presence of two witnesses, this 6th day of February, 1905.

JULES CÉSAR NAPOLÉON FOUILLOY.

Witnesses:
 HANSON C. COXE,
 ARTHUR GOOD.